UNITED STATES PATENT OFFICE.

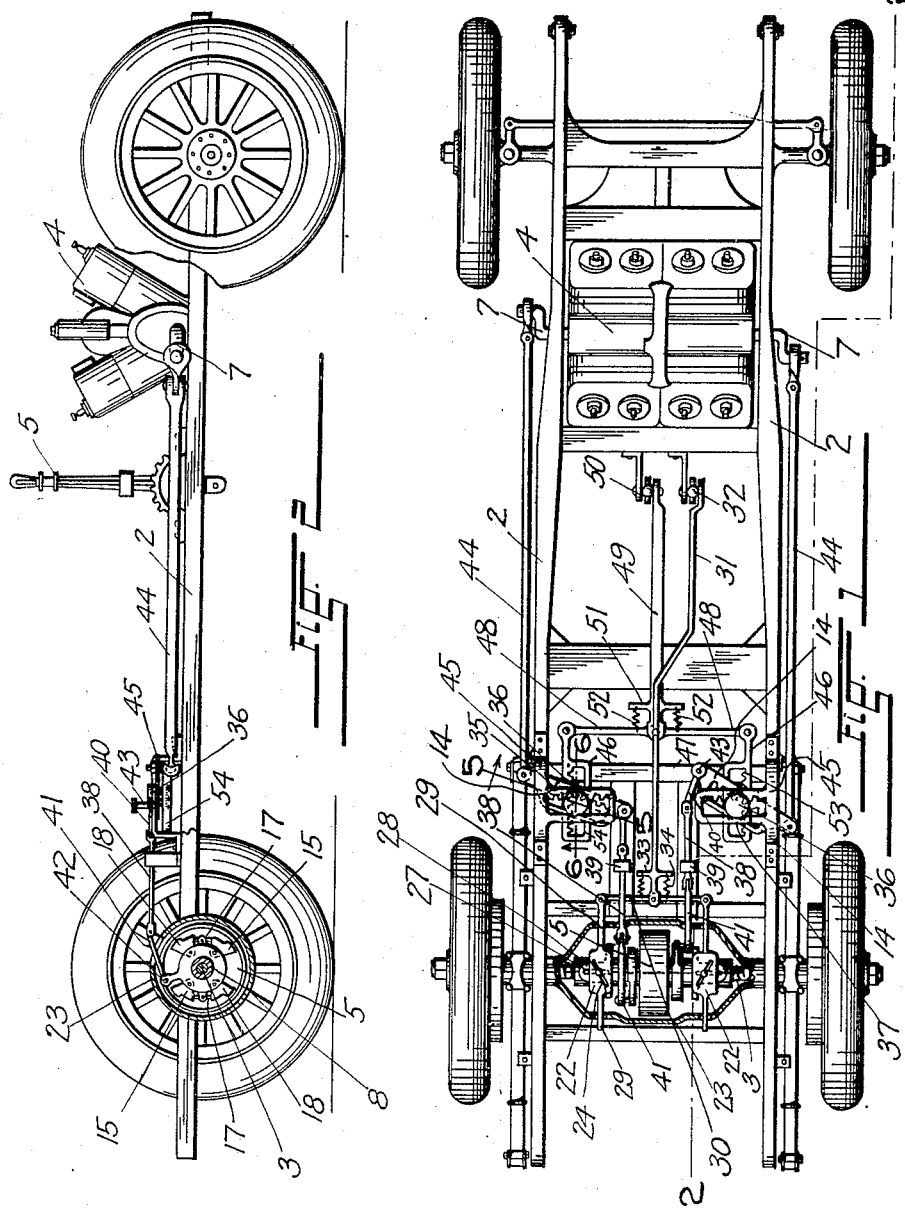

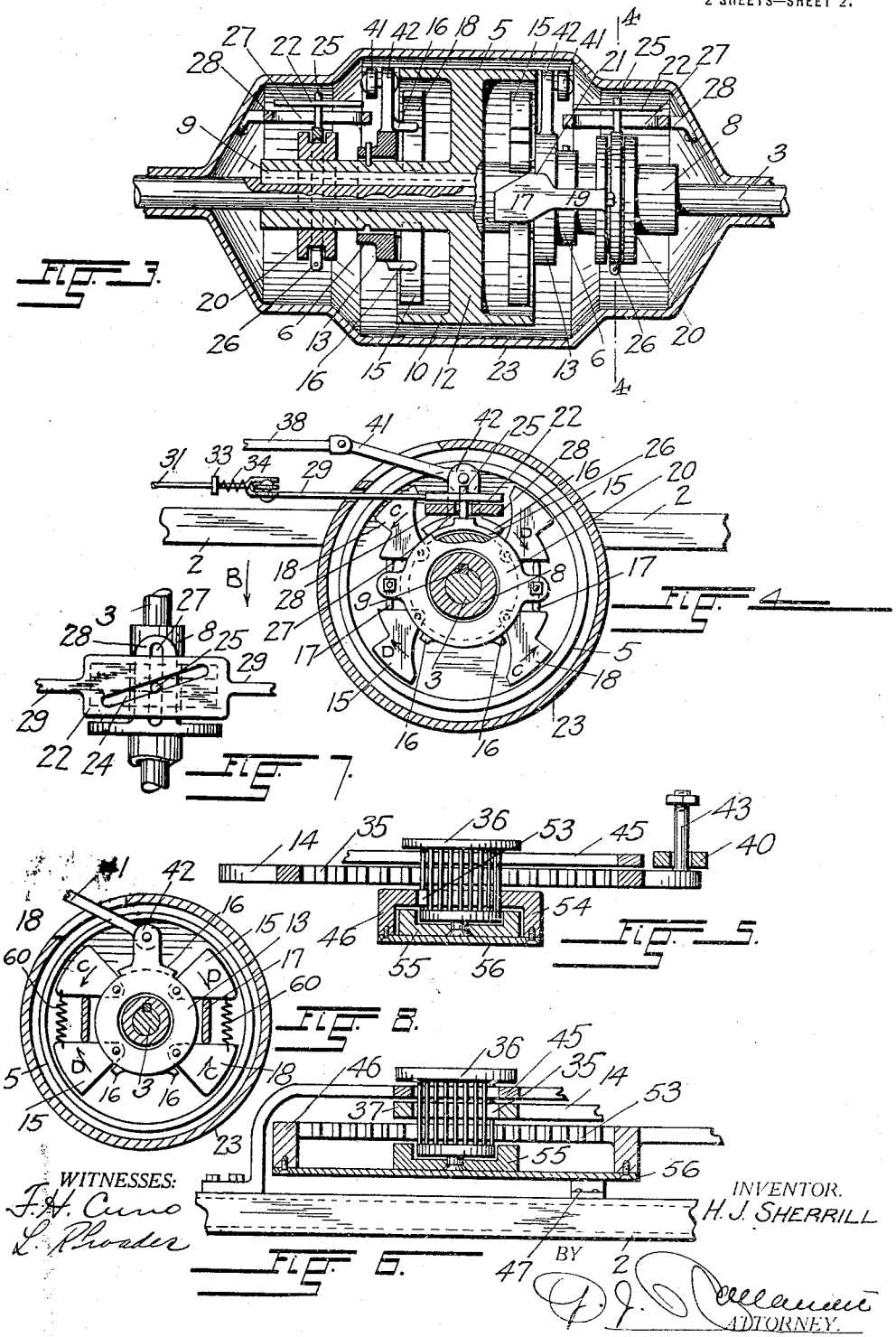

HARRY J. SHERRILL, OF SALIDA, COLORADO.

TRANSMISSION MECHANISM.

1,200,660.   Specification of Letters Patent.   Patented Oct. 10, 1916.

Application filed January 25, 1916. Serial No. 74,094.

*To all whom it may concern:*

Be it known that I, HARRY J. SHERRILL, a citizen of the United States, residing at Salida, in the county of Chaffee and State of Colorado, have invented certain new and useful Improvements in Transmission Mechanism, of which the following is a specification.

My invention relates to power transmission mechanism, and its primary object resides in providing a lever movement of novel construction for transmitting power from a motor to a rotary element, said movement including an adjustable fulcrum by which the ratio of velocity between the driving and driven elements may be varied to a selected degree within determinate limits.

Other objects of my invention will fully appear in the course of the following description, with reference to the accompanying drawings in the various views of which like parts are similarly designated, and in which, Figure 1 is a plan view of the chassis of a motor-vehicle to which the improved transmission is applied, Fig. 2, a section along the line 2—2, Fig. 1, Fig. 3, an enlarged section taken along the line 3—3, Fig. 1, Fig. 4, a transverse section along the line 4—4, Fig. 3, Fig. 5, a section taken along the line 5—5, Fig. 1, drawn to an enlarged scale, Fig. 6, an enlarged section taken along the line 6—6, Fig. 1, Fig. 7, an enlarged plan view of one of the cams of the speed control, and Fig. 8, a section similar to that shown in Fig. 4 showing a modified construction of the friction gear.

Referring to the drawings, the reference character 2 designates the chassis of a motor-vehicle, 3 the live axle of the same, and 4 the motor which as usual is mounted adjacent the front end of the chassis.

My improved transmission comprises a friction gear consisting of a driven-member 5 fixed on the axle 3 of the vehicle and two driving members 6 which are operated conjointly by connection with the crank-shaft 7 of the engine.

The driven member of the friction-gear consists of a wheel composed of an elongated hub 8 secured upon the shaft 3 by a feather 9, and a wide rim 10 which is connected with the hub by a central web 12. The interior circumferential surface of the rim at opposite sides of the web constitutes two friction faces which in the operation are engaged by the driving members of the gear.

The driving members consist of collars 13 rotatably mounted upon the hub of the wheel 5 and at opposite sides of the rim of the same, in connection with the crank shaft of the motor. These connections are established through the intermediary of levers 14 movable about adjustable fulcrums as will hereinafter be more fully described.

Blocks 15 and 18 adapted to engage the friction faces of the member 5, are pivotally secured at quadrant points of the collars 13. Stops 16 fixed on the collars determine the directions in which the blocks may move about their pivotal axes when subjected to centrifugal force by rotation of the axle on which the wheel is mounted, and adjustable stops 17 are provided to arrest the centrifugal motion of one or two of the blocks between which they are applied for the purpose of determining the direction of rotation of the driven member by action of the driving members, or to discontinue its rotative continuity with the same. The blocks on the collars are arranged in pairs the members of which are diametrically opposite each other and the stops on the collars are placed with relation to the pivots of the blocks so that the blocks of one pair are movable by centrifugal force only when the collar on which they are mounted, moves in a given direction, while those of the other pair move by the same force only during rotation of the collar in the opposite direction.

The adjustable stops hereinbefore referred to consist of blades which extend between adjoining blocks of the two pairs. The two blades thus associated with each of the driving members of the friction gear, are formed on stems 19 rigidly secured to a disk 20 that is slidably mounted upon the hub of the driven member. The longitudinal edges of each blade are formed to provide parallel contact faces 21 placed partially opposite each other and partially out of alinement so that by proper adjustment of the blade, the said faces may be brought in contact with the blocks between which the blade is positioned, either simultaneously or exclusive of each other.

The two adjustable stops controlling the movements of the four blocks of each driving member, move in unison by means hereinafter to be described, and by the arrangement of their contact faces as hereinbefore set forth, they may thus be employed to either lock the blocks comprised in one pair or the other, against centrifugal motion in accordance to the direction in which the axle of the vehicle is to be driven through the medium of the driven member, or to lock all the blocks against pivotal motion whereby the driving members are compelled to run idly and the friction gear is placed in what is commonly known as the neutral condition.

The mechanism for shifting the blades associated with the two driving elements, simultaneously to any one of the three positions hereinbefore referred to, comprises a pair of reciprocating cams 22 which are shiftably mounted in alined openings of the casing 23 in which the friction gear is inclosed. The cams have slots 24 extending obliquely with relation to the direction of their movement, through which project pins 25 which extend radially from rings 26 rotatably mounted in peripheral grooves of the disks 20 to which the blades 17 are attached. The pins are guided to move in a direction parallel to the axis of the shaft in slots 27 of plates 28 which are positioned beneath the cams in fixed relation to conveniently located parts of the housing or the chassis of the vehicle. The bodies of the cams in which the slots are formed, are intermediate of two alined rods 29 which project through openings of the casing, in which the cams are shiftably supported. Normally alined links 30 pivotally attached at the forward ends of the cam rods 29, connect with a common pivot at the end of a rod 31 which at its opposite end is connected with an operating lever 32. Transverse arms 33 on the rod are by means of coiled springs 34 connected with the links to yieldingly maintain their alinement and thereby permit of the independent movement of either of the cams in case the other is temporarily held by the load on the driving member of the friction gear with which it is associated.

The levers 14 of the transmission hereinbefore referred to, include racks 35 and the fulcrums are provided by pinions 36 of the lantern type which mesh with said racks. Bars 37 formed on the levers parallelly opposite to the racks, secure their operative engagement with the respective pinions which are rotatably connected with an adjustment hereinafter to be described. The levers are connected at one of their ends with the collars of the driving members of the friction gear at the respective sides of the driven member, by means of bars 38 which are slidably supported in bearings 39 on a fixed part of the chassis, and links 40 and 41 which connect the opposite ends of said bars respectively with the ends of the levers 14 and with lugs 42 extending radially from the collars 20. The connections between the levers 14 and the links 40 connecting with the bars 38, are established through the medium of elongated pivot pins 43 shown in Fig. 5, which permit of the relative displacement of the chassis and the axle of the vehicle when the latter is in motion. The other ends of the levers 14 are connected with cranks at opposite ends of the motor shaft, by means of rods 44 which connect with the respective cranks and levers by universal joints.

The fulcrum adjustment hereinbefore referred to, consists of a pair of slides 46 which are supported upon a transverse part 47 of the chassis of the vehicle. Normally alined links 48 pivotally attached to the slides connect at their opposite ends with a common pivot at the end of a rod 49 which is connected with an operating lever 50. Cross-arms 51 on the rod 49 are by means of springs 52 connected with the links 48 to yieldingly maintain them in alinement and equalize their movements as in the construction described with relation to the controlling mechanism of the friction gear. The slides 46 of the fulcrum adjustment have racks 53 extending in the direction of their movement, which mesh with the pinions 36, and bars 54 positioned opposite to and parallel with the racks to insure their constant engagement with the respective pinions. The pinions are rotatably supported upon shoes 55 which are mounted upon bottom plates 56 of the slides to move longitudinally with relation to their racks. To guide the fulcrum-pinions during their adjustment and assure their movement in straight lines, I provide guides 45 which extend laterally from the side bars of the chassis above the levers 14. The guides 44 are like the levers and the slides 46, provided with parallel racks and bars which engage opposite sides of the pinions as shown in Fig. 1.

In the operation of my improved transmission mechanism, the rotating crank shaft of the motor imparts an oscillating movement to the levers 14 and the therewith connected collars 13 of the driving members of the friction gear. Premising that it is desired to run the axle of the vehicle in a forward direction as is indicated by the arrow B in Fig. 4, the stops 17 of the movement controlling mechanism are adjusted to the position in which one of their contact faces engage the blocks 15 of one of the pairs exclusive of the blocks 18 comprised in the other pair, which thus are free to move about their pivots in the direction indicated by the arrow C. During movement of the oscillating collars of the driving member in one direction, the blocks are forced into frictional contact with the interior surface of the rim of the driven member with the result that the axle on which the latter is mounted is rotated in the same direction. During movement of the collars in the opposite direction, the blocks whose movement is arrested by the stops 16, move idly until the movement of the collars is again reversed, and the intermittent movement thus imparted to the driven member, in coaction with the impetus of the moving parts, will effect a continuous movement of the rotary shaft with which the driven member of the friction-gear is connected. To reverse the movement of the axle, the blades 17 are adjusted to bring their friction faces in engagement with the blocks 18, thereby locking said blocks against centrifugal motion and releasing those of the other pair for movement in the direction of the arrow D. As a result of this arrangement, the oscillating driving members of the friction gear move idly in the direction of the arrow B and in driving connection with the wheel 5 during their movement in the opposite direction. To place the transmission in a neutral condition, the blades 17 are adjusted to the position in which both their contact faces engage the blocks between which the blades are positioned and all the blocks of the driving members are in consequence locked against movement about their pivots. To vary the ratio of velocity between the shaft of the motor and the axle 3, the relative positions of the levers 14 and their fulcrums is varied by rotating the pinions by longitudinal movement of the slides 46 which movement is converted into longitudinal movements of the levers whose racks are engaged by the pinions.

In the construction shown in Fig. 8, the blocks of the friction gear are by means of springs 60 held yieldingly in engagement with the edges of the blades 17 placed between them for the purpose of making their movement more positive.

Having thus described the construction and operation of my improved transmission mechanism, it will be readily understood that while it is particularly adapted for use on motor driven vehicles, it may be effectively used in connection with any other mechanism to transmit power from an engine to a rotary driven element.

Having thus described my invention what I claim and desire to secure by Letters-Patent is:

1. In combination with a driving element and a rotary driven element, a pinion, a lever in operative connection with the driving element, said lever having a series of teeth engaging with the pinion, a transmission gear comprising a driven member in connection with the driven element and a driving member connected with said lever, a sliding rack meshing with the pinion, a carrier upon which said pinion is mounted, slidable on said rack, and means for the adjustment of the rack.

2. In combination with a driving element and a rotary driven element, two pinions, two levers in operative connection with said driving element, said levers having series of teeth engaging said pinions, a transmission gear comprising a driven member in connection with the driven element and driving members connected with said levers, sliding racks meshing with said pinions, an adjusting lever, a rod connected therewith, links pivotally connecting said rod with the two racks, and resilient connections between the rod and the links.

3. In combination with a driving element and a rotary driven element, two pinions, two levers in operative connection with said driving element, said levers having series of teeth engaging said pinions, a transmission gear comprising a driven member in connection with the driven element and driving members connected with said levers, sliding racks meshing with said pinions, an adjusting-lever, and resilient means for the conjunctive adjustment of said racks by movement of said adjusting lever.

4. In power transmission mechanism, a friction-gear comprising a rotary driven member having a friction face concentric to its axis of rotation, and a driving member comprising an oscillating carrier, friction blocks pivoted on said carrier, one of said blocks being adapted to engage the friction face during movement of the carrier in one direction, and the other block being capable of engaging said face during movement of the carrier in the opposite direction, and a sliding blade movable between said blocks and having opposite contact faces partially out of alinement and arranged to engage said blocks for obstructing their said movement.

5. In power transmission mechanism, the combination with a rotary shaft, of a friction gear comprising a driven member fixed on the shaft and having a friction face concentric to its axis of rotation, a driving member comprising an oscillating collar supported on the shaft, friction blocks pivoted on said collar, one of said blocks being adapted to engage the friction face during movement of the carrier in one direction and the other block being capable of engaging said face during movement of the carrier in the opposite direction, a disk slidable on the shaft, means for the adjustment of said disk, a ring rotatable on said disk, and a blade on said ring, movable between the blocks and adapted to obstruct the said movement of both or either one of said blocks.

6. In power transmission mechanism, a friction-gear comprising a rotary driven member having a friction face concentric to its axis of rotation, and a driving member comprising an oscillating carrier, friction blocks pivoted on said carrier, one of said blocks being adapted to engage the friction face during movement of the carrier in one direction, and the other block being capable of engaging said face during movement of the carrier in the opposite direction, a sliding blade movable between said blocks and having opposite contact faces partially out of alinement and arranged to engage said blocks for obstructing their said movement, and springs yieldingly holding said blocks in engagement with said blades.

7. In combination with a driving element and a driven element, a pinion, a lever connected to transmit the movement of the driving element to the driven element, said lever having a series of teeth meshing with said pinion, a sliding rack meshing with the pinion for its adjustment along the teeth of the lever, and a stationary rack meshing with the pinion to guide it during its said adjustment.

8. In combination, a driving element, a driven element, a lever connected to transmit the movement of the driving element to the driven element, and having a series of teeth, a pinion meshing with said teeth and mounted to travel along the same by rotation, and means for rotating the pinion whereby to adjust its position with relation to the lever.

9. In combination, a driving element, a driven element, a lever connected to transmit the movement of the driving element to the driven element, and having a series of teeth, a pinion meshing with said teeth and mounted to travel along the same by rotation, means for rotating the pinion whereby to adjust its position with relation to the lever, and means for holding said pinion against axial displacement.

10. In combination, a driving element, a driven element, a lever connected to transmit the movement of the driving element to the driven element, and having a series of teeth, a pinion meshing with said teeth and mounted to travel along the same by rotation, means for rotating the pinion whereby to adjust its position with relation to the lever, and a stationary rack meshing with said pinion to hold it against axial displacement.

In testimony whereof I have affixed my signature in presence of two witnesses.

HARRY J. SHERRILL.

Witnesses:
F. W. BRUSH.
E. M. WOOD.

Copies of this patent may be obtained for five cents each, by addressing the "Commissioner of Patents, Washington, D. C."